United States Patent [19]
Cakmaz et al.

[11] Patent Number: 5,557,930
[45] Date of Patent: Sep. 24, 1996

[54] DRIVE UNIT HAVING AN ELECTRIC MOTOR

[75] Inventors: Aydogan Cakmaz, Stuttgart; Arno Röhringer, Ditzingen, both of Germany

[73] Assignee: Mercedes-Benz A.G., Stuttgart, Germany

[21] Appl. No.: 445,212

[22] Filed: May 18, 1995

[30] Foreign Application Priority Data

May 24, 1994 [DE] Germany ............................ 44 18 071.3

[51] Int. Cl.$^6$ ................................................... F16D 31/02
[52] U.S. Cl. ............................ 60/433; 60/436; 123/41.12; 180/422
[58] Field of Search ............................ 60/433, 435, 436; 180/422, 441; 123/41.11, 41.12

[56] References Cited

U.S. PATENT DOCUMENTS

| | | | |
|---|---|---|---|
| 2,807,246 | 9/1957 | Jacobs | 123/41.12 |
| 3,283,527 | 11/1966 | Cauvin | 123/41.12 |
| 3,991,846 | 11/1976 | Chichester et al. | 60/433 |
| 4,100,739 | 7/1978 | Shaffer | 60/433 |
| 4,283,009 | 8/1981 | Deem | 123/41.12 |
| 4,344,284 | 8/1982 | Lang | 60/433 |
| 4,425,766 | 1/1984 | Claypole | 123/41.12 |
| 4,738,330 | 4/1988 | Suzuki et al. | 123/41.12 |

FOREIGN PATENT DOCUMENTS

| | | |
|---|---|---|
| 0115643 | 8/1984 | European Pat. Off. . |
| 1476110 | 8/1969 | Germany . |
| 3110591 | 1/1982 | Germany . |
| 4014175 | 10/1990 | Germany . |
| 1309256 | 3/1973 | United Kingdom . |
| 1579014 | 11/1980 | United Kingdom . |

*Primary Examiner*—F. Daniel Lopez
*Attorney, Agent, or Firm*—Klaus J. Bach

[57] ABSTRACT

In a drive unit which includes an electric motor and a cooling fan as well as a hydraulic power steering pump to be driven by the electric motor, the cooling fan is operatively connected to the motor by a clutch and a control circuit is provided for operating the clutch so as to disengage the cooling fan whenever the power steering unit needs hydraulic fluid for steering assistance, whereby both, the cooling fan and the hydraulic pump, are never operated at the same time so that the motor may be relatively small, light and inexpensive.

4 Claims, 1 Drawing Sheet

U.S. Patent
Sep. 24, 1996
5,557,930
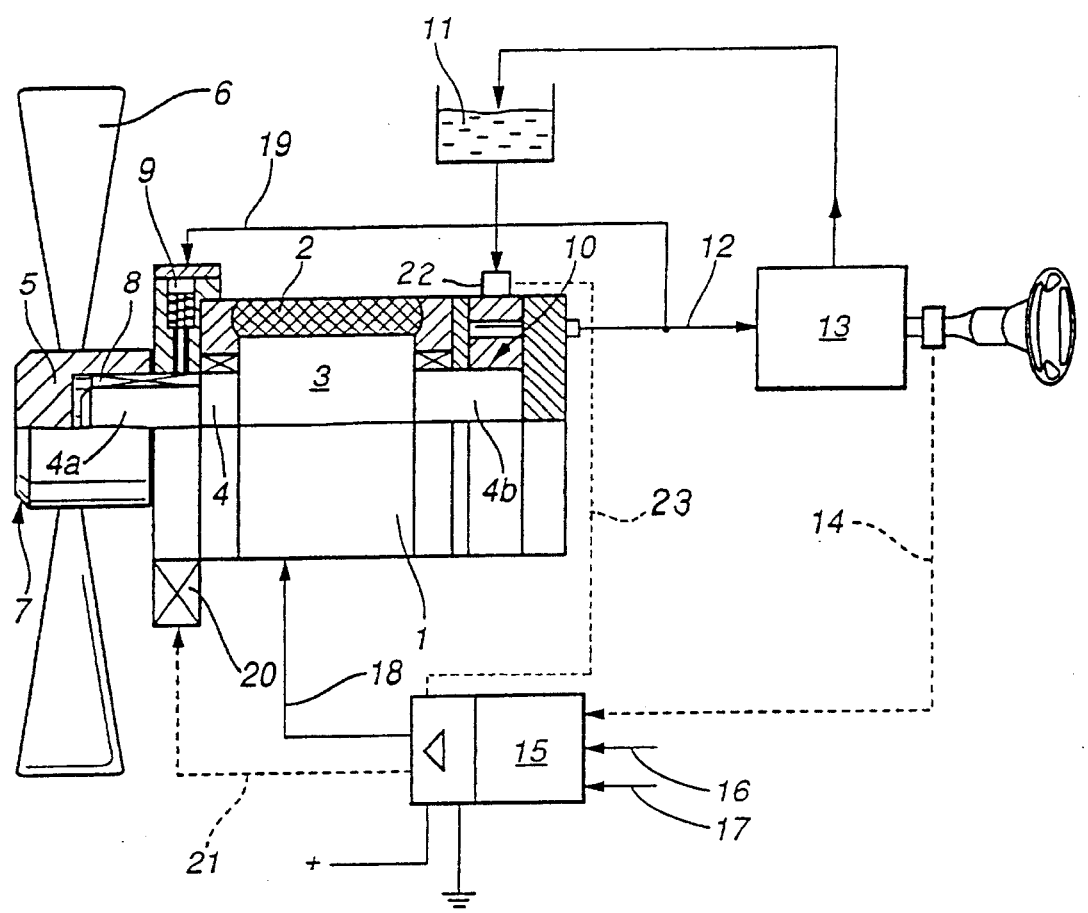

DRIVE UNIT HAVING AN ELECTRIC MOTOR

BACKGROUND OF THE INVENTION

The invention relates to a drive unit including an electric motor for driving a cooling fan of a motor vehicle engine and for driving a hydraulic pump.

Drive units of this type are known, for example, from DE 40 14 175 A1. These known drive units include an electric motor serving as the drive for an oil pump and also for the cooling fan, the driveshafts of the oil pump and cooling fan being arranged coaxially and each being connected to an end of the electric motor driveshaft which project from the opposite sides of the electric motor. Such arrangements eliminate the need for additional electric motors for driving the individual components. In addition to omitting the need for an electric motor, this also has the advantage that the weight of the drives is reduced. Since with these arrangements both, the oil pump and the cooling fan, are operated continuously, the electric motor for driving them must, however, be designed to be sufficiently powerful.

DE-OS 14 76 110 furthermore discloses an arrangement with an electric motor as a drive device for all the accessory units of a motor vehicle engine, wherein the electric motor is powered by the vehicle electrical circuit and is running at a constant speed independently of the internal combustion engine. In this improved arrangement the accessories and the cooling fan for the engine coolant may all be driven at the same time when this is necessary because of a relatively high coolant temperature. Consequently, the electric-motor drive is designed to be sufficiently powerful to be able to drive all the accessory units.

It is known in principle, for example, from DE 31 10 591 C2 to drive a pump or a fan alternately by an electric motor by changing the direction of rotation of the electric motor. Then however, the motor needs to be stopped and again accelerated in the reverse for this purpose. This not only consumes power but also requires a relatively powerful and expensive motor and thus increases weight and costs which should be maintained as low as possible.

It is the object of the present invention to provide a drive unit which, although having at least two different accessory units, can be driven by an electric motor which need not, however, be dimensioned to be able to drive the accessory units at the same time.

SUMMARY OF THE INVENTION

In a drive unit which includes an electric motor and a cooling fan as well as a hydraulic power steering pump to be driven by the electric motor, the cooling fan is operatively connected to the motor by a clutch and a control circuit is provided for operating the clutch so as to disengage the cooling fan whenever the power steering unit needs hydraulic fluid for steering assistance whereby both the cooling fan and the hydraulic pump are never operated at the same time so that the motor may be relatively small, light and inexpensive.

On the basis of the knowledge that, for example, power for the power-assisted steering is required only occasionally and for relatively short time intervals, the electric motor is provided with a clutch for engaging and disengaging the cooling fan, and a circuit for operating the clutch is provided in such a manner that the drive for the power-assisted steering has precedence and the drive for the cooling fan is disengaged when the power-assisted steering requires power. Since this is the case only occasionally and for short time intervals, it is acceptable to disengage the cooling fan for this time interval, since it will be re-engaged after a relatively short period. Specifically, when the power-assisted steering no longer needs power, the cooling fan is immediately re-engaged so that there is no substantial rise in the coolant temperature of the engine which, as known from experience, will not rise noticeably in such short time intervals.

In one embodiment of the invention, the clutch for the cooling fan can be engaged or disengaged via an electromagnet, which can be done in a known manner, for example, via an electromagnetic clutch. Alternatively, it is also possible to provide the clutch for the cooling fan with a switchable freewheeling mechanism in a simple manner, which freewheeling mechanism receives its switching pulses either hydraulically as a result of the power-assisted steering being switched on, or via an electrical signal, for example, likewise by controlling an electromagnet.

The invention is explained in the following text, and is illustrated in the drawing with reference to an exemplary embodiment.

BRIEF DESCRIPTION OF THE DRAWINGS

The single FIGURE shows an electrical drive for operating the cooling fan, and a servo pump for supplying power steering fluid to the power-assisted steering mechanism of the motor vehicle.

DESCRIPTION OF A PREFERRED EMBODIMENT

The FIGURE shows schematically an electric motor having a housing which accommodates a stator 2 and a rotor 3 which is mounted on a driveshaft 4 with two ends 4a and 4b respectively projecting from the housing of the electric motor 1 at opposite ends thereof. One end 4a carries a hub 5 of a cooling fan 7, whose blades 6 are connected to the hub 5. The hub 5 is connected via a freewheeling mechanism 8 to the shaft end 4a, which freewheeling mechanism 8 is operable by a switching device 9, which is not illustrated in detail. The freewheeling mechanism has one switching state in which the fan is rotationally fixed to the shaft end 4a and another switching state in which the fan 7 is disengaged from the shaft 4. The hub 5 of the cooling fan 7 is thus driven either by the motor 1, or it is freewheeling depending on the switching state of the freewheeling mechanism 8.

On the other end of the electric motor 1, the impeller of a servo pump 10 is mounted on the shaft end 4b for rotation therewith. The pump 10 receives hydraulic fluid from a container 11 for pressurization of the hydraulic fluid which then can be conveyed via pressure line 12 to the power steering unit 13 when fluid under pressure and fluid flow is required to assist the driver of the vehicle.

In this arrangement, the impeller of the hydraulic pump 10 always rotates with the shaft 4 of the motor 1. However, it needs power only when fluid is supplied from the container 11, via the pressure line 12, to the power steering unit 13. The supply of fluid to the pump 10 can be controlled by a valve 22 arranged in the fluid supply line. The valve is operated, for example, via a control line 23 by a torque and steering angle-dependent control signal which is provided by the steering mechanism, via a line 14, to an electronic control device 15 which is connected to an electrical power supply. Via a control line 18, the electronic control device 15 also determines the rotational speed of the electric motor 1 as a function of the cooling water temperature, which is supplied by a signal 16, or as a function of the driving speed, which is supplied by a signal 17. The electric motor 1 receives its energy in a normal manner from the electrical circuit of the vehicle, in particular, from the battery and the generator.

The fluid pressure line 12 has a connecting line 19 leading to the switching device 9 for operating the freewheeling mechanism 8. Thus, if the motor 1 is running and pressurized fluid is required by the power steering unit 13, there is also a corresponding fluid pressure in the connecting line 19. The fluid pressure can be used by the switching device 9 for the purpose of switching the freewheeling mechanism 8 such that the cooling fan 7 is disengaged from the shaft 4 and rotates in a freewheeling manner. Thus, while fluid is being supplied to the power steering unit 13, the motor 1 needs no additional energy for driving the cooling fan 7.

Since, from experience, the power steering unit 13 requires power for only relatively short periods, the pressure the line 12 drops again after a short period so that the switching device 9 again switches the freewheeling mechanism 8 off so as to couple the hub 5 of the cooling fan 7 to the shaft 4. The electric motor is then used exclusively for driving the cooling fan and, as has been described already earlier, is controlled as to its rotational speed and power by the electronic control device 15.

Instead of the switching device 9, which is operated hydraulically via the connecting line 19, it would, of course, also be possible to utilize an electromagnet 20 which as indicated by dashed control, line 21 is operated by electronic control device 15 when it is informed, via the line 14, that the power steering unit 13 is demanding power. The electromagnet 20 then switches the freewheeling mechanism 8 on so that the cooling fan 7 is disengaged from the shaft 4.

The electromagnet 20 is operated via the control line 21 which is connected to the electronic control device 15.

With the new arrangement, it is possible to use a drive motor having insufficient power for driving two units at the same time, that is, a cooling fan and a fluid pump of a motor vehicle engine. The power steering unit is in this case preferentially switched on while the cooling fan 7, which is normally driven by the electric motor 1, is disengaged whenever the power steering unit requires power.

What is claimed is:

1. Drive unit including an electric motor for driving a cooling fan and for driving a hydraulic pump of a motor vehicle adapted to supply pressurized fluid to a power steering unit, said electric motor having a clutch for engaging and disengaging said cooling fan, and a control circuit for operating said clutch in such a manner that the operation of the power steering unit has preference over the operation of the cooling fan and said cooling fan is disengaged from said motor when said power steering unit requires pressurized fluid for steering assistance.

2. A drive unit according to claim 1, wherein said clutch for said cooling fan includes an electromagnet adapted to engage said cooling fan with, or disengage it from, said electric motor.

3. A drive unit according to claim 1, wherein said clutch for said cooling fan is provided with a switchable freewheeling mechanism.

4. A drive unit according to claim 3, wherein said freewheeling mechanism includes a hydraulic switching device in communication with said power steering unit for disengaging said fan from said motor whenever said power steering unit requires pressurized fluid for steering assistance.

\* \* \* \* \*